(12) United States Patent
Jardak

(10) Patent No.: US 12,111,394 B2
(45) Date of Patent: Oct. 8, 2024

(54) METHOD AND DEVICE FOR IMPROVED RANGE TRACKING FOR INVERSE SYNTHETIC APERTURE RADAR

(71) Applicant: Kabushiki Kaisha Toshiba, Tokyo (JP)

(72) Inventor: Seifallah Jardak, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 657 days.

(21) Appl. No.: 17/326,412

(22) Filed: May 21, 2021

(65) Prior Publication Data

US 2022/0373674 A1    Nov. 24, 2022

(51) Int. Cl.
G01S 13/90     (2006.01)
G01S 7/41      (2006.01)
G01S 13/58     (2006.01)

(52) U.S. Cl.
CPC ............ *G01S 13/9064* (2019.05); *G01S 7/41* (2013.01); *G01S 13/58* (2013.01); *G01S 13/9029* (2013.01)

(58) Field of Classification Search
CPC ........ G01S 13/9064; G01S 7/41; G01S 13/58; G01S 13/9029
USPC ....................................................... 342/25 R
See application file for complete search history.

(56) References Cited

U.S. PATENT DOCUMENTS

| 4,985,704 A | * | 1/1991 | Smith | G01S 13/9011 342/25 D |
| 5,179,383 A | * | 1/1993 | Raney | G01S 13/9011 342/25 D |
| 5,250,952 A | * | 10/1993 | Roth | G01S 13/904 342/25 F |
| 5,831,570 A | * | 11/1998 | Ammar | G01S 13/913 342/149 |
| 5,854,602 A | * | 12/1998 | Stankwitz | G01S 13/904 342/25 F |
| 5,923,278 A | * | 7/1999 | Poehler | G01S 13/9019 342/25 C |
| 6,011,505 A | * | 1/2000 | Poehler | G01S 13/9019 342/25 C |
| 6,046,695 A | * | 4/2000 | Poehler | G01S 13/9019 342/25 A |

(Continued)

FOREIGN PATENT DOCUMENTS

| CN | 102707282 A |   | 10/2012 |   |
| CN | 110501706 A | * | 11/2019 | ............. G01S 13/90 |

OTHER PUBLICATIONS

Itoh et al., "Motion Compensation for ISAR Via Centroid Tracking", IEEE Transactions on Aerospace and Electronic Systems, vol. 32, No. 3, Jul. 1996, pp. 1191-1197.

(Continued)

*Primary Examiner* — Nuzhat Pervin
(74) *Attorney, Agent, or Firm* — Oblon, McClelland, Maier & Neustadt, L.L.P.

(57) ABSTRACT

The present application presents various techniques for improving the performance of range tracking motion compensation method for high resolution radar imaging. Three improved techniques are described herein: improved cross-correlation alignment through updates to the reference range profile to follow the target's changing illumination angle; improved cross-correlation alignment through local peak boosting; and, improved polynomial smoothing through subdivision into multiple windows.

18 Claims, 17 Drawing Sheets

(56) References Cited

U.S. PATENT DOCUMENTS

| | | | | |
|---|---|---|---|---|
| 6,107,953 | A * | 8/2000 | Dwyer | G01S 13/9023 342/191 |
| 7,145,496 | B2 * | 12/2006 | Cho | G01S 13/9027 342/25 R |
| 7,369,083 | B2 * | 5/2008 | Budic | G01S 13/003 342/159 |
| 7,456,780 | B1 * | 11/2008 | Garren | G01S 13/9019 342/194 |
| 7,551,119 | B1 * | 6/2009 | Doerry | G01S 13/904 342/25 R |
| 7,646,327 | B1 * | 1/2010 | Freeman | G01S 13/9029 342/194 |
| 7,928,896 | B2 * | 4/2011 | Jin | G01S 13/904 342/73 |
| 8,937,849 | B1 * | 1/2015 | Marston | G01S 15/89 367/88 |
| 9,103,910 | B2 * | 8/2015 | Holder | G01S 13/06 |
| 9,247,874 | B2 * | 2/2016 | Kumar | G01N 21/4795 |
| 10,310,074 | B1 * | 6/2019 | Ni | G01S 13/9019 |
| 10,705,205 | B2 * | 7/2020 | Wan | G01S 13/9027 |
| 11,340,342 | B2 * | 5/2022 | Xin | H01Q 15/08 |
| 2002/0033818 | A1 * | 3/2002 | Lin | G06V 20/64 345/419 |
| 2006/0109163 | A1 * | 5/2006 | Cho | G01S 13/9027 342/25 R |
| 2009/0249465 | A1 * | 10/2009 | Touboul | H04W 12/12 726/11 |
| 2010/0037321 | A1 * | 2/2010 | Oz | H04W 12/062 726/24 |
| 2010/0103028 | A1 * | 4/2010 | Young | G01S 13/904 342/25 A |
| 2010/0259442 | A1 * | 10/2010 | Abatzoglou | G01S 13/282 342/25 A |
| 2013/0009807 | A1 * | 1/2013 | Lamb | G01S 13/904 342/25 B |
| 2013/0219457 | A1 * | 8/2013 | Touboul | G06F 21/562 726/1 |
| 2013/0311110 | A1 * | 11/2013 | Aizikov | H01J 49/0036 702/32 |
| 2014/0090046 | A1 * | 3/2014 | Touboul | H04L 63/02 726/12 |
| 2014/0130122 | A1 * | 5/2014 | Oz | G06F 1/3209 726/1 |
| 2015/0204973 | A1 * | 7/2015 | Nohara | G01S 7/003 342/107 |
| 2017/0230421 | A1 * | 8/2017 | Touboul | H04L 63/0263 |
| 2017/0235952 | A1 * | 8/2017 | Touboul | H04L 63/02 726/16 |
| 2017/0257381 | A1 * | 9/2017 | Oz | H04L 63/20 |
| 2017/0286730 | A1 * | 10/2017 | Sadr | G06K 7/10099 |
| 2018/0324192 | A1 * | 11/2018 | Oz | G06F 21/57 |
| 2019/0260767 | A1 * | 8/2019 | Oz | H04L 63/20 |
| 2019/0353779 | A1 * | 11/2019 | Wan | G01S 13/9027 |
| 2020/0142055 | A1 * | 5/2020 | Fox | G01S 13/9011 |
| 2020/0174096 | A1 * | 6/2020 | Cho | G01S 7/414 |
| 2021/0116558 | A1 * | 4/2021 | Chan | G08G 3/00 |

OTHER PUBLICATIONS

Chen et al., "Target-Motion-Induced Radar Imaging", IEEE Transactions on Aerospace and Electronic Systems, vol. AES-16, No. 1, Jan. 1980, pp. 2-14.

Mallat et al., "Matching Pursuits With Time-Frequency Dictionaries", IEEE Transactions on Signal Processing, vol. 41, No. 12, Dec. 1993, pp. 3397-3415.

\* cited by examiner

  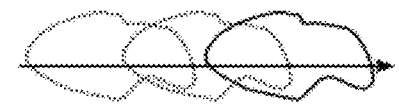
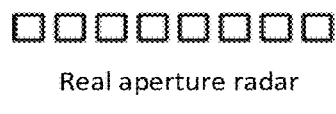 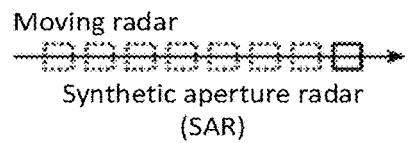 
Fig. 1A     Fig. 1B     Fig. 1C

METHOD AND DEVICE FOR IMPROVED RANGE TRACKING FOR INVERSE SYNTHETIC APERTURE RADAR

FIELD

The present disclosure relates to methods and systems for compensating for range shift in radar range profiles. In particular, but without limitation, this disclosure relates to motion compensation methods for inverse synthetic aperture radar (ISAR).

BACKGROUND

Dense and long real aperture radars produce high resolution images of a scene despite poor weather and light conditions. Radar imaging can even detect objects concealed beneath clothes, hidden to optical sensors. To reduce hardware complexity, the real aperture radar can be replaced with a virtual or synthesized sampling, also referred to as a synthetic aperture radar (SAR).

SAR refers to the case where a moving radar coherently processes multiple scans of a stationary target. The inverse scenario, where the radar is stationary and the scene/target is moving, is referred as Inverse SAR (ISAR). In contrast to the known radar motion, the movement of the target is often unknown and cannot be controlled.

DESCRIPTION OF DRAWINGS

Arrangements of the present disclosure will be understood and appreciated more fully from the following detailed description, made by way of example only and taken in conjunction with drawings in which:

FIG. 1A shows an example of real aperture radar to produce an image of a target;

FIG. 1B shows an example of SAR to produce an image of a target;

FIG. 1C shows an example of ISAR to produce an image of a target;

DETAILED DESCRIPTION

Figure 2:
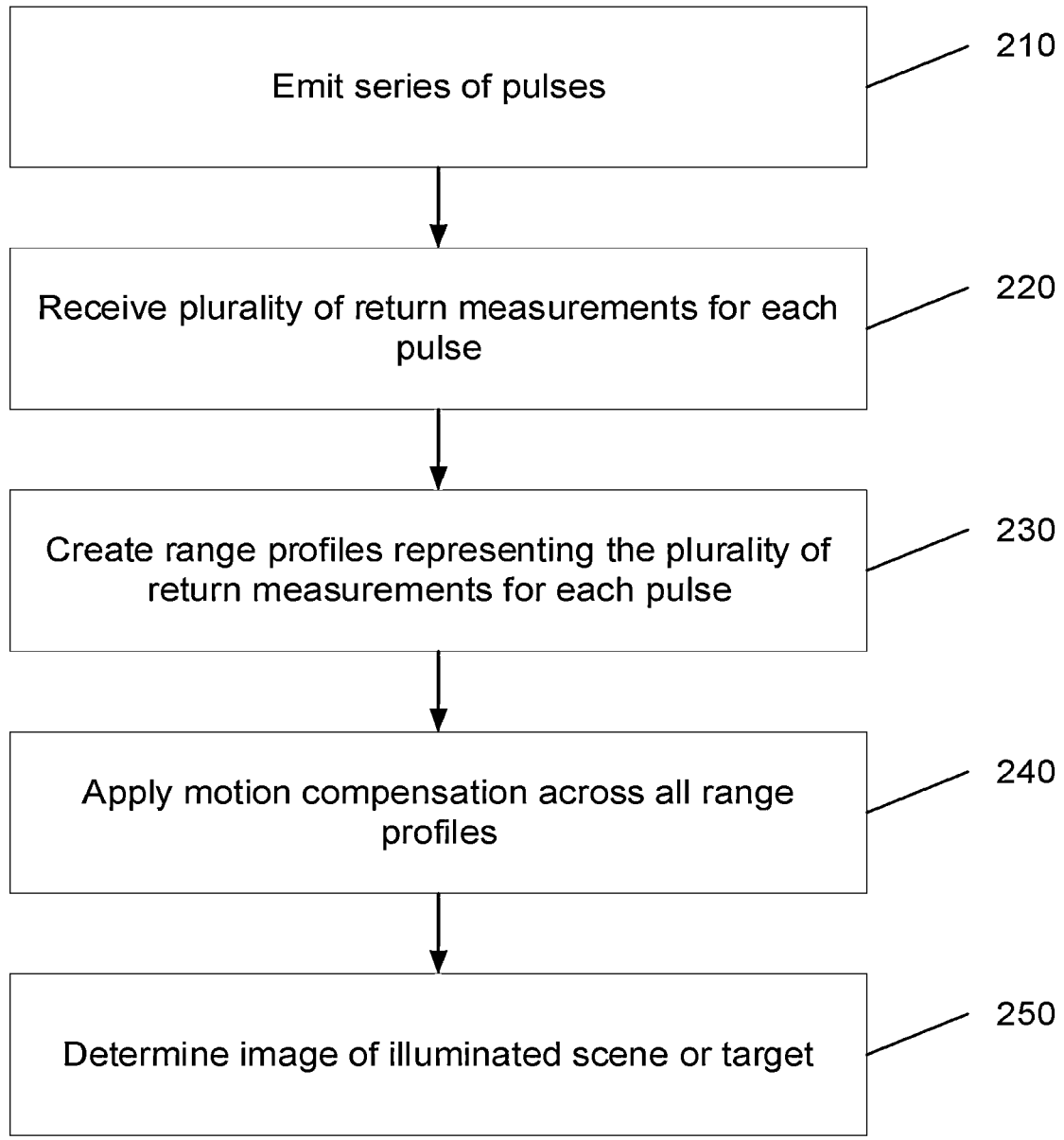
FIG. 2 shows a flowchart for an example ISAR process.

According to an aspect of the present invention there is provided a computer implemented method comprising: obtaining a plurality of range profiles each representing a plurality of return measurements from a corresponding pulse; selecting one or more sets of range profiles from the plurality of range profiles; for each set of range profiles, selecting a reference range profile from the plurality of range profiles; for each reference range profile, applying motion compensation to the corresponding set of range profiles based on the reference range profile, wherein applying motion compensation comprises: for each selected range profile in the corresponding set of range profiles, correlating the selected range profile with the reference range profile to produce a corresponding correlation distribution; determining for a first correlation distribution of the correlation distributions a range shift corresponding to a maximum correlation in the correlation distribution; for each subsequent correlation distribution from the correlation distributions: determining a region of range shifts around a determined range shift corresponding to a maximum correlation of a previous correlation distribution; increasing correlation values for the correlation distribution across the region of range shifts to produce a boosted correlation distribution; and determining a range shift corresponding to a maximum correlation in the boosted correlation distribution; and adjusting each range profile to compensate for the corresponding range shift.

By applying motion compensation to the set of range profiles based on their corresponding reference range profiles, embodiments provide an improving range tracking motion compensation method by reducing or eliminating fluctuations and possible false peaks caused by scintillation and multi-reflections. Importantly, by increasing correlation values across a region of range shifts around a previous local correlation maximum, the method is biased to select a local correlation maximum over a farther maximum, which may be a false peak caused by scintillation and multi-reflections. This biasing helps to avoid discontinuities in the motion compensation caused by noise.

Advantageously, a size of the region of range shifts is based on a shape of the previous correlation distribution.

Advantageously, the region of range shifts includes all range shifts with correlation values that are within a predefined threshold of a peak value of the previous correlation distribution.

The predefined threshold may be 3 dB or 6 dB of the peak value of the previous correlation distribution. The predefined threshold may differ depending on an expected target velocity and/or frequency of the pulses.

Advantageously, a size of the region of range shifts is based on a range resolution of the range profiles or an expected velocity of a target.

Advantageously, the method further comprises outputting each adjusted range profile to an inverse synthetic aperture radar module for determining a feature of a target.

The feature may be a shape of the target, such as a 2D or 3D image or model of the target. The feature may be determined using ISAR.

Advantageously, adjusting each range profile to compensate for the corresponding range shift comprises shifting the range profile by the corresponding range shift.

Advantageously, selecting one or more reference range profiles from the plurality of range profiles comprises selecting a plurality of reference range profiles from the plurality of range profiles.

Advantageously, the corresponding reference range profile is selected from the corresponding set of range profiles.

Advantageously, selecting each set of range profiles is based on an expected target velocity.

Advantageously, selecting each set of range profiles is based on a frequency of the corresponding pulses.

Advantageously, adjusting each range profile to compensate for the corresponding range shift comprises: subdividing the range shifts into a plurality of windows; for each window, fitting a polynomial distribution to the range shifts in the window; combining the polynomial distributions into a combined distribution; obtaining a smoothed range shift for each range profile by sampling from the combined distribution; and adjusting each range profile to compensate for the corresponding smoothed range shift.

Advantageously, the method further comprises removing range shifts that exceed a previous or following range shift by a threshold.

Advantageously, the method may further comprise removing range shifts that exceed a directly previous or following range shift by a threshold.

Advantageously, the plurality of windows partially overlap. Each window may partially overlap with at least one adjacent window.

Advantageously, combining the polynomial distributions into a combined distribution comprises taking an average between polynomial distributions within overlapping regions of the plurality of windows.

Each window may include at least one overlapping region with an adjacent window and an average between the polynomial distributions from the overlapping windows may be taken over the overlapping region.

Advantageously, a size of each of the plurality of windows is based on an expected target velocity.

Advantageously, a size of each of the plurality of windows is based on a frequency of the corresponding pulses.

According to an aspect of the present invention there is provided a non-transitory machine-readable storage medium storing instructions which, when executed, cause a processing device to perform a method including: obtaining a plurality of range profiles each representing a plurality of return measurements from a corresponding pulse; selecting one or more sets of range profiles from the plurality of range profiles; for each set of range profiles, selecting a reference range profile from the plurality of range profiles; for each reference range profile, applying motion compensation to the corresponding set of range profiles based on the reference range profile, wherein applying motion compensation comprises: for each selected range profile in the corresponding set of range profiles, correlating the selected range profile with the reference range profile to produce a corresponding correlation distribution; determining for a first correlation distribution of the correlation distributions a range shift corresponding to a maximum correlation in the correlation distribution; for each subsequent correlation distribution from the correlation distributions: determining a region of range shifts around a determined range shift corresponding to a maximum correlation of a previous correlation distribution; increasing correlation values for the correlation distribution across the region of range shifts to produce a boosted correlation distribution; and determining a range shift corresponding to a maximum correlation in the boosted correlation distribution; and adjusting each range profile to compensate for the corresponding range shift.

According to an aspect of the present invention there is provided a system comprising: a memory; and a processing device, operatively coupled with the memory, to: obtain a plurality of range profiles each representing a plurality of return measurements from a corresponding pulse; select one or more sets of range profiles from the plurality of range profiles; for each set of range profiles, select a reference range profile from the plurality of range profiles; for each reference range profile, apply motion compensation to the corresponding set of range profiles based on the reference range profile, wherein applying motion compensation comprises: for each selected range profile in the corresponding set of range profiles, correlate the selected range profile with the reference range profile to produce a corresponding correlation distribution; determine for a first correlation distribution of the correlation distributions a range shift corresponding to a maximum correlation in the correlation distribution; for each subsequent correlation distribution from the correlation distributions: determine a region of range shifts around a determined range shift corresponding to a maximum correlation of a previous correlation distribution; increase correlation values for the correlation distribution across the region of range shifts to produce a boosted correlation distribution; and determine a range shift corresponding to a maximum correlation in the boosted correlation distribution; and adjust each range profile to compensate for the corresponding range shift.

According to an embodiment of the present invention there is provided a computer implemented method comprising: obtaining a plurality of range profiles each representing a plurality of return measurements from a corresponding pulse; selecting a plurality of reference range profiles from the plurality of range profiles; and for each reference range profile: selecting a corresponding set of range profiles from the plurality of range profiles; and applying motion compensation to the set of range profiles based on the corresponding reference range profile.

Selecting a plurality of reference range profiles from the plurality of range profiles updates the reference range profile to follow the target's illumination angle as a result of the target's motion.

According to further embodiment of the present invention there is provided a computer implemented method comprising: obtaining a plurality of range shifts of corresponding to a plurality of range profiles, each representing a plurality of return measurements from a corresponding pulse; subdividing the plurality of range shifts into a plurality of windows; for each window, fitting a polynomial distribution to the range shifts in the window; combining the polynomial distributions for each window into a combined distribution; obtaining smoothed range shifts by sampling from the combined distribution; and outputting the smoothed range shifts.

A target's motion can shift by several resolution cells between two consecutive pulses and this can result in a step-like discontinuous output across the plurality of range profiles. Fitting a polynomial distribution to the range shifts produces a continuous output across the plurality of range profiles, which provides a more accurate representation of the target's motion. Subdividing the plurality of range shifts into a plurality of windows provides a smoother output and allows a lower order polynomial to be used without loss of information.

ISAR takes advantage of the relative motion between the radar and the scene of interest, as shown in FIG. 1.

FIG. 1A shows an example of real aperture radar to produce an image of a target. The target is stationary for the purpose of this example. In other examples, the target can be in motion. In other examples, the image of the target can be captured quickly enough to assume that the target is stationary. The target is surrounded by multiple radar antennas that emit a series of radio pulses to the target. The target reflects the radio pulses back to the multiple radar antennas as Doppler radio pulses which are received by the multiple radar antennas as a plurality of range profiles representing a plurality of return measurements from the corresponding radio pulses.

Each range profile corresponds to a single pulse. Each range profile is a measurement of received power over time from each of the multiple radar antennas. The delay between the pulse emission and reflection measurement can be converted into distance (range) to the reflecting target based on the speed of light. Accordingly, each range profile represents the measured power of pulse reflection(s) at various ranges.

This can be a continuous distribution, or can be quantised, e.g. across a set of discrete ranges (range cells).

Once a plurality of range profiles have been acquired, these can then be processed to determine the range and shape of the target, including other characteristics such as surface roughness. The overall peak (global maximum) of the range profile will usually represent the distance to the main body of the target, whilst other range measurements may represent other portions of the target body at different distances, return reflections off of various objects, or other objects in the scene being imaged. A problem associated with real aperture radars is that multiple radar antennas are required to create a large aperture for a high resolution image of the target.

FIG. 1B shows an example of SAR to produce an image of a target. The target is surrounded by a single moving radar antenna that moves relative to the target. The target is stationary for the purpose of this example. In other examples, the target can be in motion. The single moving radar antenna emits series of radio pulses along its path of motion and the target reflects the radio pulses back to the single moving radar antenna as Doppler radio pulses which are received by the single moving radar antenna as a plurality of range profiles representing a plurality of return measurements from the corresponding radio pulses. The plurality of range profiles can then be processed to determine the range and shape of the target, including other characteristics such as surface roughness. This effectively produces the same results as emitting and receiving radio pulses from multiple locations with the use of a single radar antenna instead of multiple radar antennas. The movement of the radar antenna creates a synthetic aperture that is much larger than a single radar aperture and eliminates the need for multiple radar antennas for a high resolution image of the target.

FIG. 1C shows an example of ISAR to produce an image of a target. ISAR relies on the target's movement to determine the range and shape of the target, including other characteristics such as surface roughness. The radar is stationary for the purpose of this example. In other examples, the radar can be in motion.

FIG. 2 shows a flowchart for an example ISAR process. The radar antenna emits 210 a series of radio pulses during the motion of the target and the target reflects the radio pulses back to the radar antenna as Doppler radio pulses. The radar antenna receives 220 a plurality of return measurements for each pulse. The radio pulses by the radar antenna represent a plurality of range profiles representing a plurality of return measurements from the corresponding radio pulses. Accordingly, range profiles are created 230 to represent the plurality of return measurements for each pulse. This effectively produces the same results as emitting and receiving radio pulses from multiple locations with the use of a single radar instead of multiple radars. The movement of the target creates a synthetic aperture that is much larger than a single radar aperture and eliminates the need for multiple radar antennas for a high resolution image of the target.

Motion compensation is then applied 240 to the plurality of range profiles to account for the unknown motion of the target relative to the radar. The motion compensated range profiles are then used to determine 250 an image of the target or illuminated scene.

Higher resolution images are obtained if the target is illuminated for a higher integration angle which often results in longer scanning duration. This is because a higher integration angle results in a larger synthetic aperture. Motion compensation pre-processing before the determination of the image of the target, improves the signal to noise ratio (SNR) of the image by aligning return measurements across the plurality of range profiles. However, with longer scanning time, the target's motion can easily become more complex putting additional stress on motion compensation methods.

Hence, motion compensation is considered an important pre-processing ISAR step as it allows coherent processing of multiple scans. Motion compensation can also be used in SAR applications with high resolution requirements and/or inaccurate radar platform positioning sensor(s).

A single radar return measurement provides a one-dimensional range profile of the whole illuminated scene. In other terms, all scatterers on the target located at a same range to the radar will be lumped into a single peak.

Figure 3:
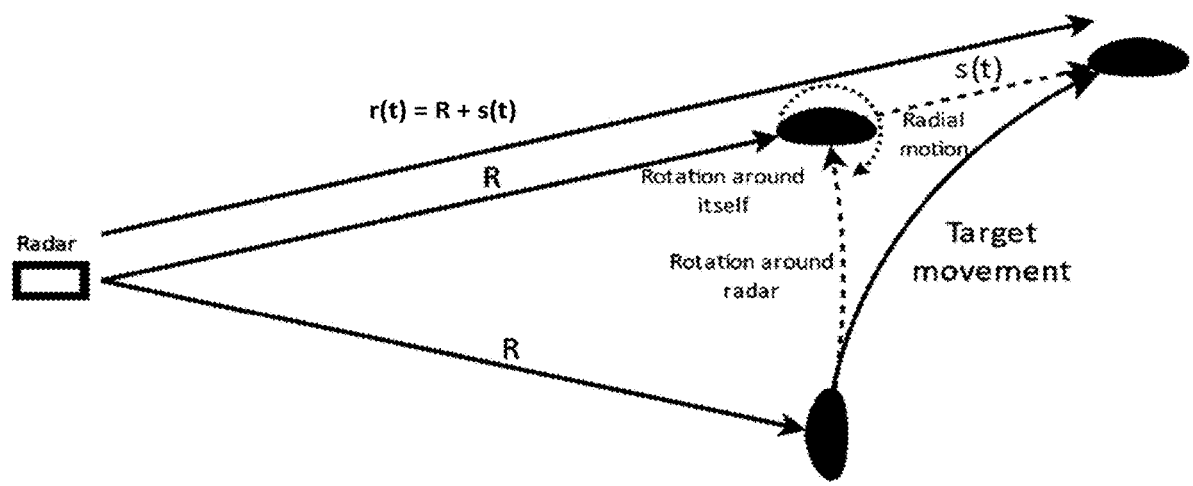
FIG. 3 shows an example motion for a target.

FIG. 3 shows an example motion for a target. In general, a target's motion can be generally converted into three main parts: a rotation around itself, a rotation around the radar, and a radial motion.

A target's rotation around itself at an approximately constant rotational velocity results in scatterers located at different ranges from the centre of rotation to generate distinct Doppler frequencies. ISAR imaging coherently processes many one-dimensional range profiles to detect these Doppler variations and create a two-dimensional image of the target with dimensions (range×cross-range).

A rotation around the radar (at constant range, R) does not affect radar return measurements provided that the target remains within an antenna main beam.

Figure 4:
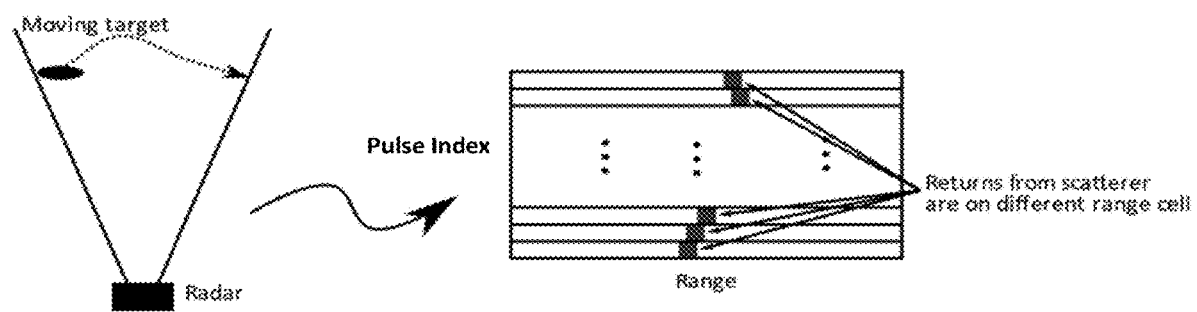
FIG. 4 shows an example of the return measurements for a target moving radially and circumferentially.

Lastly, radial motion causes the power of the return measurements to shift from one range cell corresponding to a given range, or distance, from the radar antenna, to another range cell, corresponding to another range, over multiple scans (pulses), as shown in FIG. 4.

FIG. 4 shows an example of the return measurements for a target moving radially and circumferentially. The circumferential movement does not affect the range profiles for each pulse provided that the target remains within the antenna main beam. Having said this, as the target moves away from the antenna, the return pulses will take more time to reach the antenna, so the peak of the return measurements moves to reflect the increased distance to the target. In practice, the range is divided into different range cells, representing different discrete ranges (distances).

As SAR and ISAR require multiple pulses (multiple measurements) over a period of time, return measurements from the same scatterer on the target may be spread over multiple range cells due to target motion, resulting in a lower signal to noise ratio (SNR). Motion compensation converts the complex target motion and suppresses radial shifts before processing the range profiles to determine the image of the target.

Motion compensation can be carried out in two steps. First, coarse motion compensation can align the peaks of the range profiles to the same range (same range cell) using either non-parametric algorithms such as centroid algorithms, range correlation algorithms, or parametric algorithms such as matching pursuit. Second, fine motion compensation can align signal phases across multiple scans (range profiles) to suppress movements smaller than range resolution (range cells). The target can shift by several range resolution cells between two consecutive pulses (two consecutive range profiles) and this can result in a step-like discontinuous output across the plurality of range profiles. Step-like discontinuous output can be caused by target motion happening between pulses, or errors in alignment between range profiles due to high clutter or scatterer scintillation. Hence, the discontinuous output of the coarse motion compensation can be smoothed by a polynomial to obtain a continuous estimate of the target's radial motion. The smoothing can be via a low order polynomial to help reduce the noise in the output.

Figure 5:
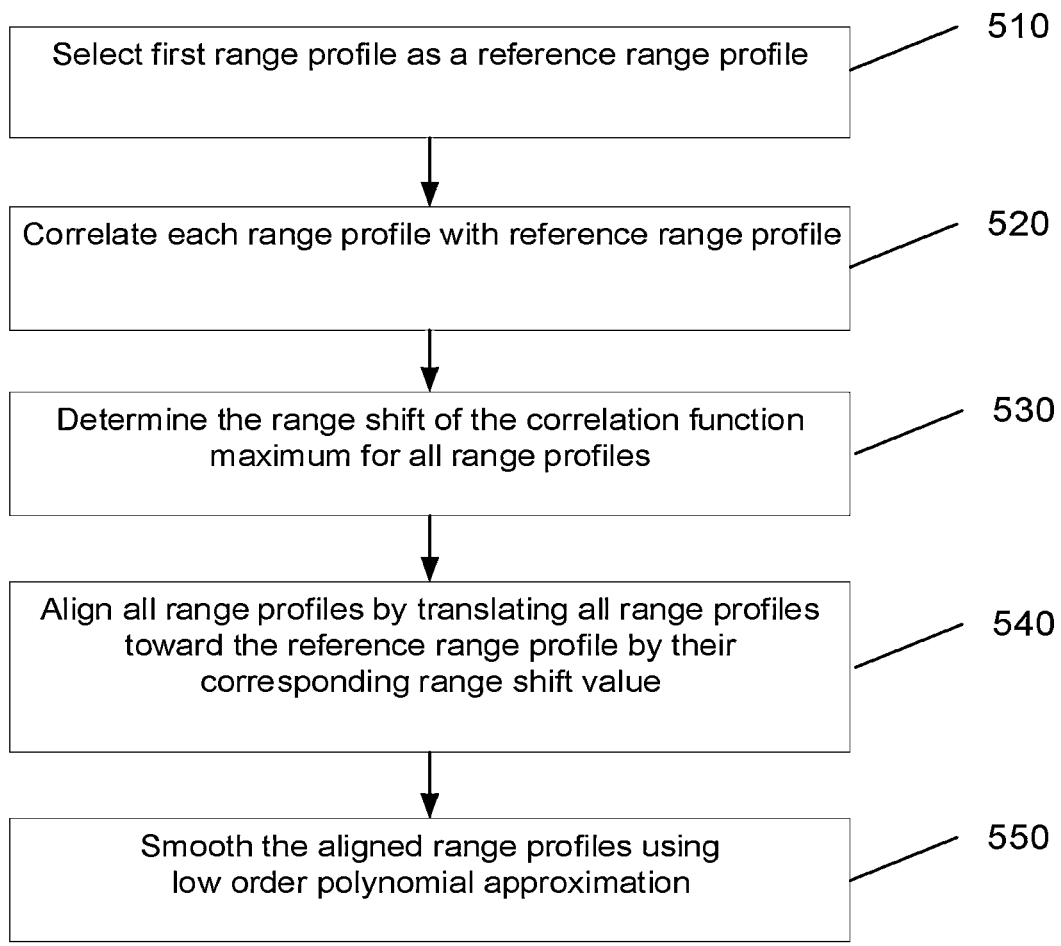
FIG. 5 shows a flowchart for an example range correlation method.

FIG. 5 shows a flowchart for an example range correlation method 500. The range correlation method, applies coarse motion compensation to align the collected plurality of range profiles with a reference range profile which can correspond to a first or centre range profile. Nevertheless, the arrangements described herein are not limited to selecting a first or centre range profile. Accordingly, in other examples, the reference range profile may correspond to any range profile selected from within the plurality of range profiles.

The range correlation method initially selects 510 a first or centre range profile as a reference range profile. The range profile then correlates 520 each range profile with the reference range profile and then determines 530 the range shift of correlation function maximum for all range profiles. That is, for each range profile, the cross correlation is determined between the range profile and the reference range profile. This produces a distribution of correlation against offset or displacement (the offset or displacement being a potential range offset or displacement between the range profile and the reference range profile). As the range profiles are expected to have a similar distribution, the offset representing the maximum cross-correlation should represent the offset required to align the given range profile with the reference range profile.

All range profiles are then adjusted to compensate for the corresponding range shift by aligning 540 all range profiles by translating all range profiles toward the reference range profile by their corresponding offset (range shift).

The range correlation method accounts for any possible range wrapping between different range profiles. The aligned range profiles can then be smoothed 550 with fine motion compensation using a low order polynomial approximation. It should be noted that polynomial smoothing is not essential, but does help to improve the motion compensation.

Figure 6:
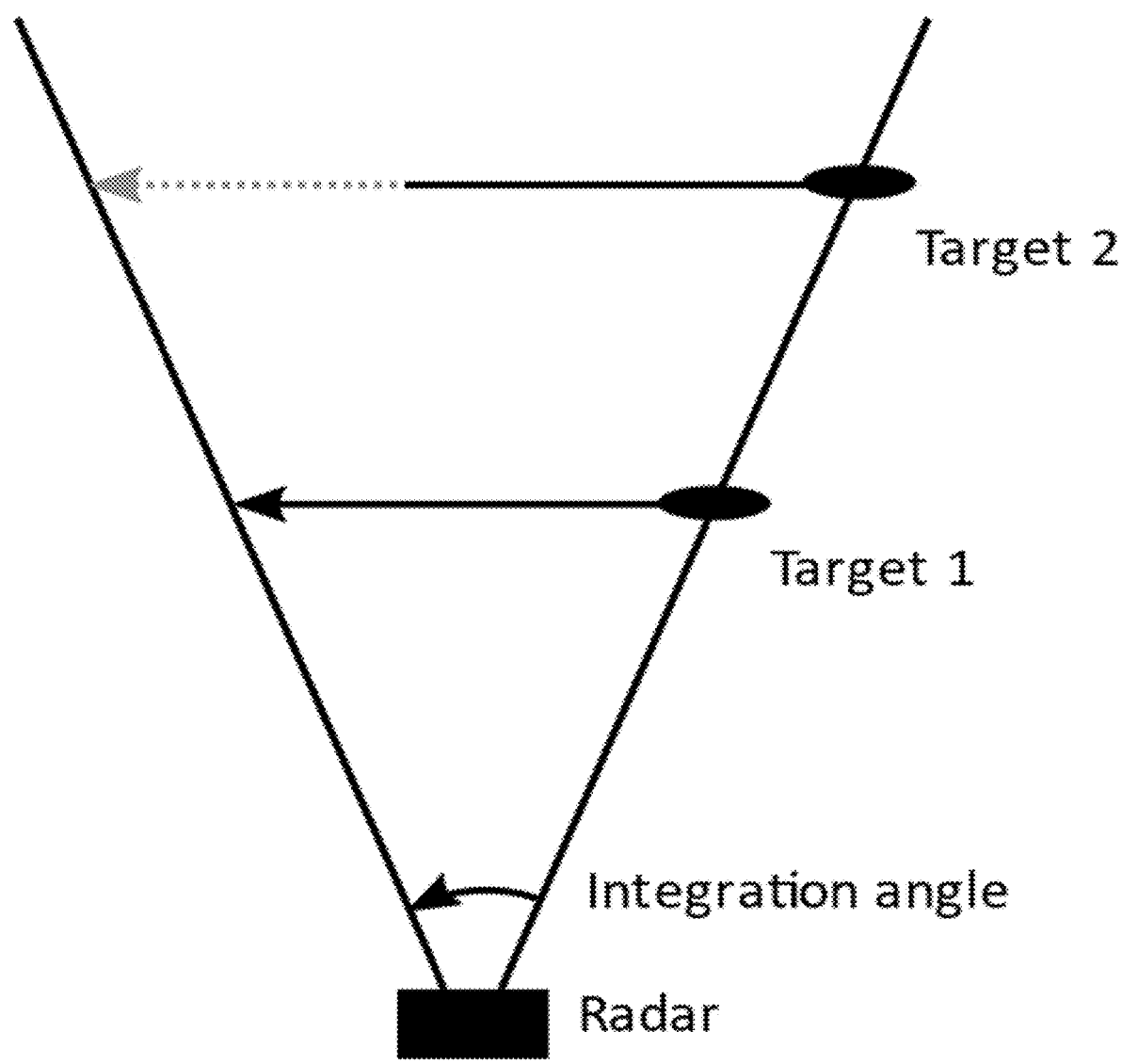
FIG. 6 shows differing scanning times for two targets at different ranges.

FIG. 6 shows differing scanning times for two targets at different ranges. The cross-range resolution of the ISAR image is proportional to an integration angle of the radar.

The integration angle is the angle around the radar over which the range measurements are taken. Scanning the target over a larger integration angle increases the resolution of the radar image. Under a constant integration angle and cross-range resolution, the distance travelled by the target increases as its range to the radar increases. In an example where near and far range targets both move at the same velocity, far targets will need to be imaged for a longer period of time to account for the extra distance travelled in order to maintain the same integration angle. During this longer period of time, the target is more likely to swivel and oscillate in front of the radar which makes motion compensation more difficult.

The range correlation method discussed above performs well with strong target reflections at high SNR. The range correlation method discussed above also performs well for short scans.

Having said this, the above range correlation method struggles to keep track of the target in presence of scintillation and multi-reflection effects which become more pronounced in long scans. The range correlation method above can be improved for longer coherent processing time (longer scans), where a target illumination angle can change significantly resulting in considerable fluctuations and possible false peaks caused by scintillation and multi-reflections.

The present application presents various techniques for improving the performance of range tracking motion compensation method for high resolution radar imaging. Three improved techniques are described herein:

1. Improved cross-correlation alignment through updates to the reference range profile to follow the target's changing illumination angle;
2. Improved cross-correlation alignment through local peak boosting;
3. Improved polynomial smoothing through subdivision into multiple windows.

These techniques can be applied independently of each other, although improved performance can be achieved through application of each improved technique.

Figure 7:
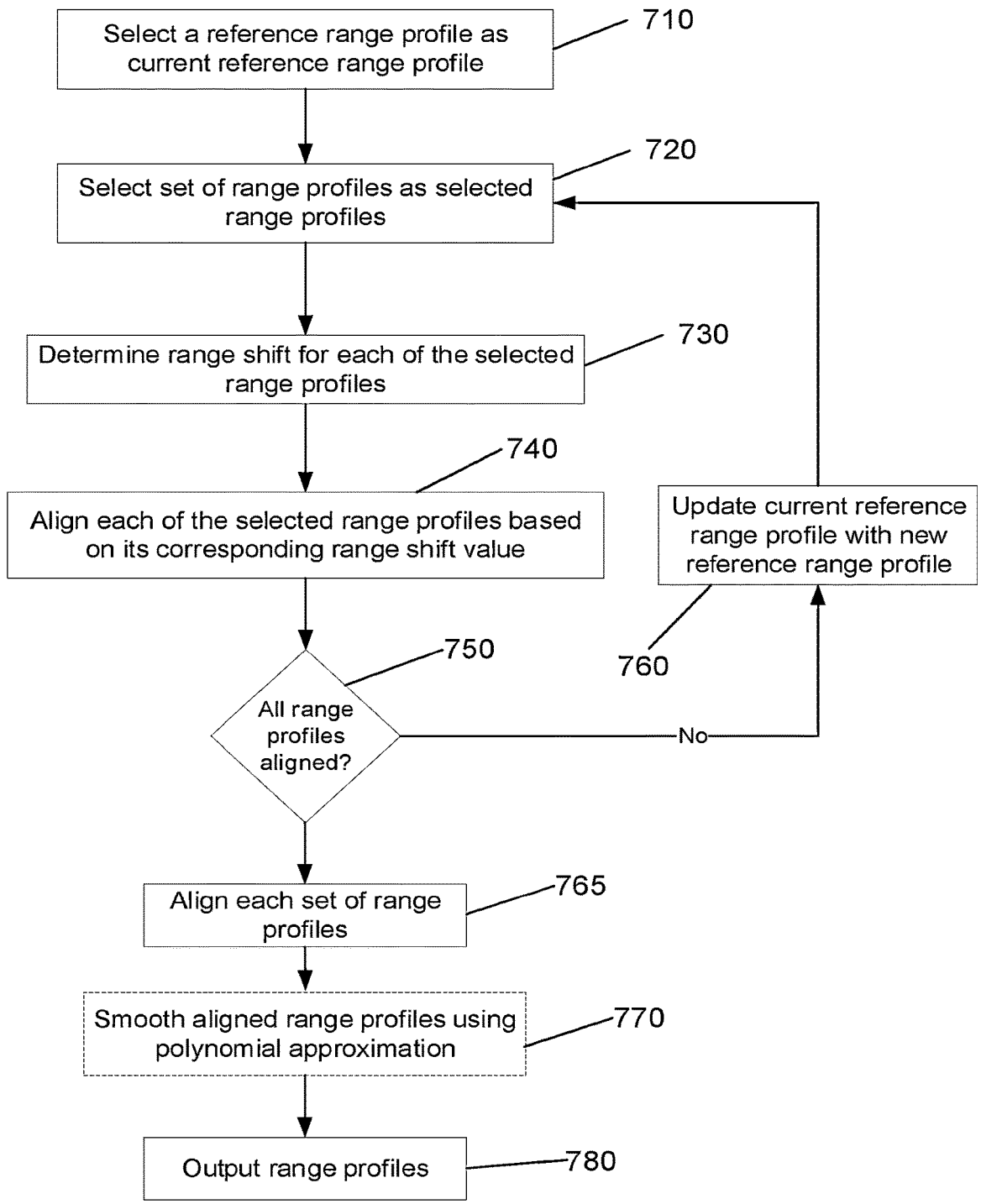
FIG. 7 shows a method of motion compensation including using updated reference range profiles according to an arrangement.

FIG. 7 shows a method of motion compensation 700 including using updated reference range profiles according to an arrangement. In general, the method subdivides the range profiles into a number of sets (subsets) of range profiles, and applies a different (updated) reference range profile to each set.

The method selects a reference range profile 710 as a current reference range profile. For the purpose of this example, the reference range profile is dynamically selected each time a new set of range profiles is selected. In other arrangements, a predetermined set of reference range profiles can be selected at the start from the plurality of range profiles. For instance, where each set of range profiles includes N range profiles, the $k(N+1)^{th}$ range profile may be selected as a reference range profile, where k is an index representing the corresponding set of range profiles (k ranging from 1 to M, where M is the number of sets of range profiles). In this example, the reference profile is the last reference profile in a group of N+1 range profiles. Accordingly, the total number of all range profiles can be expressed as M(N+1).

The method then selects a set of range profiles 720 (other than the reference range profile(s)) as selected range profiles. This is a subset of all of the range profiles taken across the whole measurement period (the integration angle).

Motion compensation is then applied to the selected range profiles based on their corresponding reference profile.

The range shift values for each of the selected range profiles is determined 730 (relative to the reference range profile). Following this, each of the selected range profiles is aligned 740 based on its corresponding range shift value. The adjustment can be by shifting each selected range profile by its corresponding range shift value.

The method then determines 750 if all range profiles have been aligned, or whether more range profiles need to be aligned. If not, then the current reference profile is updated 760 with a new reference range profile and the method returns to step 720 to select a new set of range profiles and apply motion compensation and alignment.

After all the range profiles in each subsets have been aligned to their corresponding reference profiles, each subset is aligned with respect to the each other in step 765.

In an example, the subsets are aligned by aligning the reference range profiles for each subset. Consequently, a corresponding range shift is applied to the set of range profiles that corresponds to the offset required for aligning the corresponding reference range profile to the other reference range profiles. This may be achieved in a similar manner to the other alignment steps, with the offset being chosen based on the offset of maximum correlation.

In another example, the set of range profiles and its corresponding reference range profiles are aligned by aligning the averages of range profiles (including the reference range profile) for each subset. That is, an average range profile can be taken by averaging the range measurements across the set of range profiles and the reference range profile. This can be implemented for each set of range profiles. The offsets can then be determined be comparing the average range profile. This may be achieved in a similar manner to the other alignment steps, with the offset being chosen based on the offset of maximum correlation.

In another example, the reference range profiles may be aligned before each subset of selected range profiles are aligned with respect to their corresponding reference range profiles. This requires all reference range profiles to be selected in step 710, prior to the alignment in steps 730 and 740. In this example, a consequential corresponding range shift would not need to be added after the sets of range profiles have been aligned to their corresponding reference range profiles. Instead, the motion compensation method would take the offsets between reference range profiles into account when aligning the sets of range profiles with their corresponding (already aligned) reference range profiles.

Once all range profiles have been aligned (over multiple sets of range profiles) then smoothing 770 using polynomial approximation may be applied. In other words, the aligned range profiles can be smoothed 770 using polynomial approximation. In an example, the aligned range profiles outputted by the motion compensation algorithm can be approximated in groups of short overlapping windows without increasing the approximating polynomial order. This step is optional.

The motion compensated range profiles are then output 780. These may be output to an ISAR module for determining the range to and shape of the target.

In light of the above, the reference range profile may be updated 760 across a set of range profiles to reflect changes in the target's illumination angle. Updating 760 the reference range profile comprises selecting 710 more than one reference range profile within the plurality of range profiles. Instead of correlating all scans with a single "outdated" reference range profile, this allows the motion compensation method to be applied to updated reference range profiles and correlate selected range profiles to account for the change in illumination angle of the target, thereby improving the accuracy of motion compensation.

It should be noted that, whilst the method of FIG. 7 aligns 740 the range profiles in each iteration of the method, this step can be delayed until the range shift values for all range profiles have been determined. That is, each iteration can determine range shifts for the corresponding reference range profile and corresponding set of range profiles. Once all range shift values have been determined, then all range profiles (across all selected sets) can then be aligned.

It should be noted that, in the present description, the set of range profiles do not include the reference range profile. Instead, a corresponding reference range profile is associated with the selected set of range profiles. Nevertheless, in alternative arrangements, the reference range profile may be selected from the set of range profiles. In this case, a set of range profiles may be selected and then a reference range profile may be selected from this set. Following this, each range profile (other than the reference range profile) in the set may be compared to the reference range profile to determine an offset for motion compensation.

As mentioned above, the determination of range shift values can be improved by boosting peak correlation values in the vicinity of previous peaks. This can help to bias the motion compensation method to select, for each range profile, an offset that is similar to the offset for the preceding range profile. This helps to avoid discontinuities in the offsets based on noise, and is based on the assumption that the offset will not change by a large amount between consecutive range profiles (consecutive radar pulses).

Figure 8:
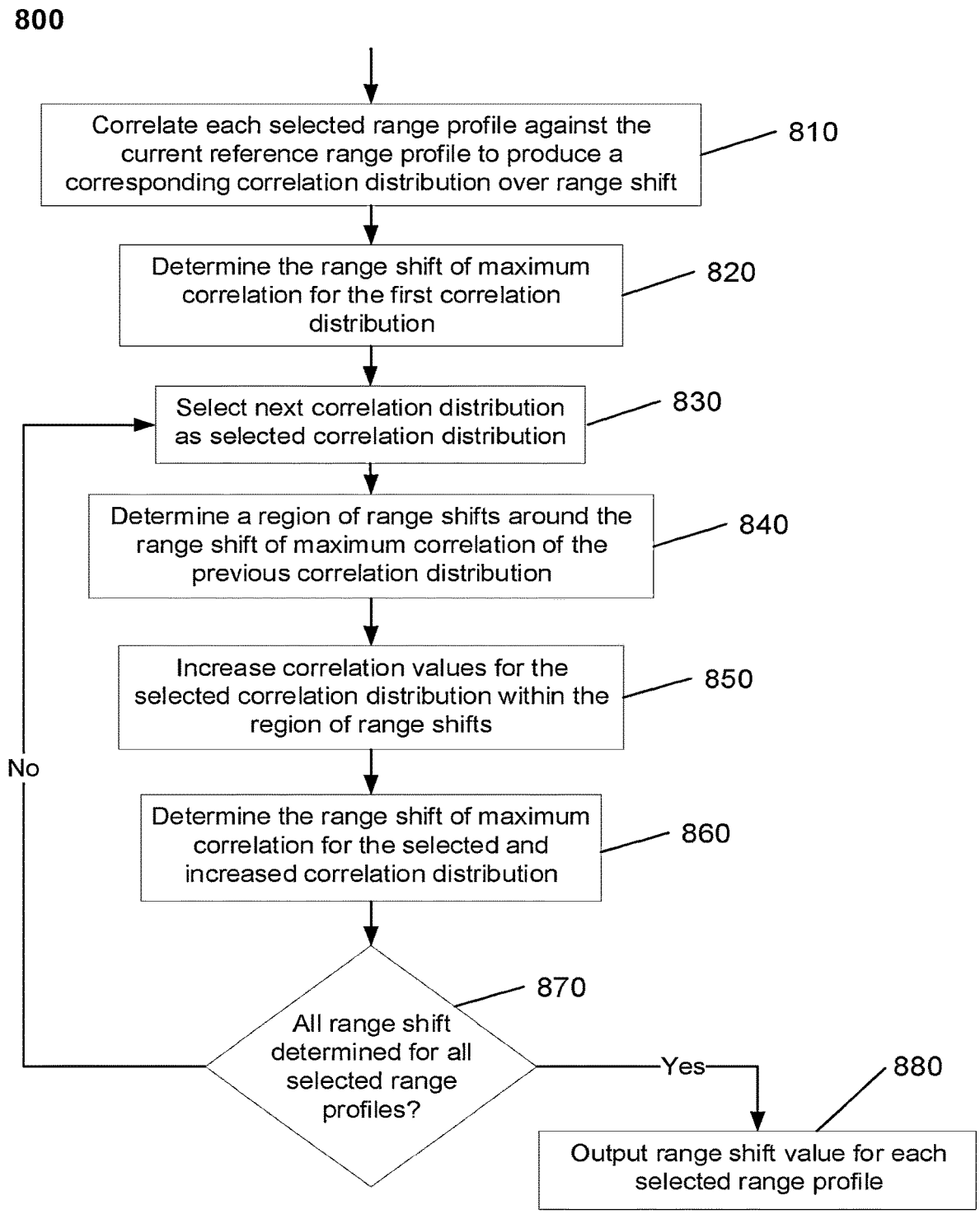
FIG. 8 shows a flowchart of a method of determining range shift values for selected range profiles according to an arrangement.

FIG. 8 shows a flowchart of a method 800 of determining range shift values for selected range profiles according to an arrangement.

The method receives the current reference range profile and selected range profiles as inputs.

Each selected range profile is correlated 810 against the current reference range profile to produce a corresponding correlation distribution over range shift. This can be done by determining the cross-correlation between the current reference range profile and each of the selected range profiles.

The range shift of correlation maximum for the first correlation distribution (corresponding to the first selected range profile) is determined 820 and the first selected range profile is assigned the range shift value. That is, the global maximum is determined from the correlation distribution, and the range shift (offset) at that global maximum is determined and assigned as the offset for the range profile.

After the first correlation distribution for the first selected range profile, the next correlation distribution is selected as a selected correlation distribution 830. This may be the correlation distribution for the next range profile in the series of range profiles (corresponding to a series of pulses).

A region of range shifts around the range shift of the maximum correlation of the previous correlation distribution is determined 840. The size of this region of range shifts can be defined based on the peak shape of the previous correlation distribution and the radar's range resolution. For example, the region of range shift can include all range shifts with correlation values that are 3 or 6-dB lower than the peak value of the previous correlation distribution.

The radar imaging system design, namely the pulse repetition frequency and the expected velocity of the target, may also provide information to estimate the maximum radial shift that can occur between pulses to determine the region of range shifts. For instance, if a radar scans each 50 ms a target moving at 1 m/s with a range resolution cell of 4 cm, then the correlation maximum is expected to shift with at most one resolution cell between consecutive scans. This knowledge can be incorporated in delimiting the region of range shifts around the local maximum of the previous correlation distribution.

Correlation values for the selected correlation distribution that are within the region of range shifts defined by the previous correlation distribution are increased 850 by a predefined amount or factor (e.g. by a "boosting factor").

All new correlation values of the current correlation distribution that lie within the region of range shifts of the previous maximum correlation will be amplified by a "boosting factor". The boosting factor determines the tendency of the algorithm to favour a far global maximum correlation instead of a maximum correlation of the current correlation distribution that lies within the region of range shifts. As the boosting factor increases, more weight is given to range shifts within the region of range shifts rather than moving to a higher global maximum correlation outside of the region of range shifts.

Following this, the range shift of the maximum correlation for the selected and increased (boosted) correlation distribution is determined 860. The range shift of the chosen maximum correlation in the selected and increased correlation distribution is assigned for the selected range profile corresponding to the selected correlation distribution.

The method then determines if all ranges shifts have been determined 870. If not, the method goes back to step 830 to select a next correlation distribution, boost the values within a range of the previous maximum and determine the range shift of maximum correlation. When all range shift values have been determined the range shift values are output 880. Conversely, the range shift values may be output 880 each time they are determined (e.g. following step 860).

The boosting factor for correlation values within the region of range shifts encourages an argument of a correlation function maximum to remain in the region of range shifts around the range shift of maximum correlation of a previous correlation distribution.

For example, let us consider the result of a new correlation which presents a local maximum correlation near the range shift of a previously registered maximum correlation for a previous correlation distribution and a farther global maximum correlation outside the region of range shifts. Instead of discarding the local maximum correlation, which is within the region of range shifts, in favour of the new global maximum correlation, we increase the correlation value of the local correlation maximum by a "boosting factor" to favour the local maximum correlation and determine range shift of the "boosted" local maximum correlation for the range profile near the maximum correlation of the previous range profile. In other words, for the maximum correlation of the selected correlation distribution to move away from the previous maximum correlation, the far global maximum correlation should exceed the near local maximum correlation by at least the "boosting factor" threshold.

The improved method of offset determination is more suitable for high resolution imaging applications which require extended scanning time also referred to as coherent processing time. The method also increases the robustness of range tracking against target scintillation and multireflection effects noticed in long scans. The proposed method obtains smoother range drift estimates to effectively compensate target motion. The long coherent processing time allows the target to swivel and the illumination angle to change rapidly resulting in random fluctuations.

To adjust the range tracking for both short- and long-range targets, the range tracking method implements the above method to render the algorithm more robust to rapid fluctuations in the target's return measurements.

Figure 9A:
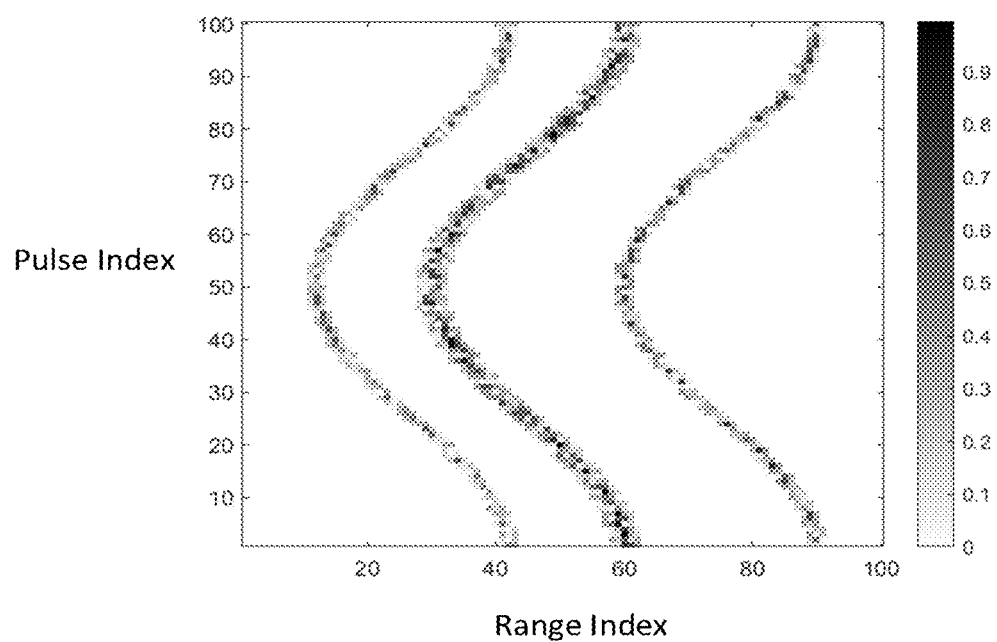
FIG. 9A presents simulated data of a rigid three-point scatter target oscillating in front of a radar during a scan.
Figure 9B:
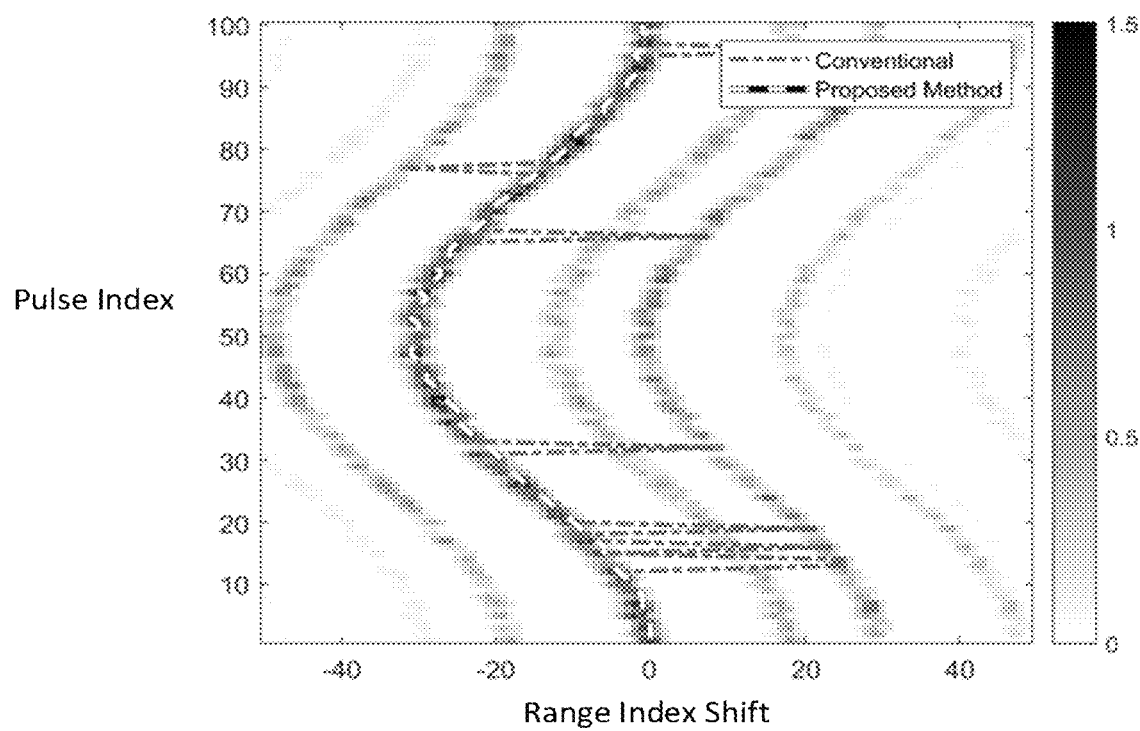
FIG. 9B presents the resulting range shifts of the simulated data of a rigid three-point scatter target oscillating in front of a radar during a scan.

FIGS. 9A and 9B presents simulated data of a rigid three-point scatter target oscillating in front of a radar during a scan. FIG. 9A shows a collection of 100 range profiles of a simulated 3-point target in presence of random scintillation. FIG. 9B presents the resulting range shifts of the simulated data of a rigid three-point scatter target oscillating in front of a radar during a scan. The received power for each pulse and each range is represented via greyscale. The right plot shows the range shift for each pulse (each range profile) for the method of FIG. 5 (dashed line) that finds the explicit global maximum correlation and for the method of FIG. 8 (white and black line) that applies the boosting factor (in this case a boosting factor of 3 dB). For both methods, the reference range profile is the first one range profile in the series. As can be seen, random power fluctuations of scatterer returns cause the method of FIG. 5 to produce offsets with frequent abrupt discontinuities. This is avoided through the method of FIG. 8.

Following the determination of offset values, the offset values can be smoothed by fitting a polynomial to the offsets. This can be improved by dividing the offsets into windows and fitting a polynomial to each window. This allows lower order polynomials to be fit, thereby increasing the effectiveness of the smoothing and making the calculations more computationally efficient.

Figure 10:
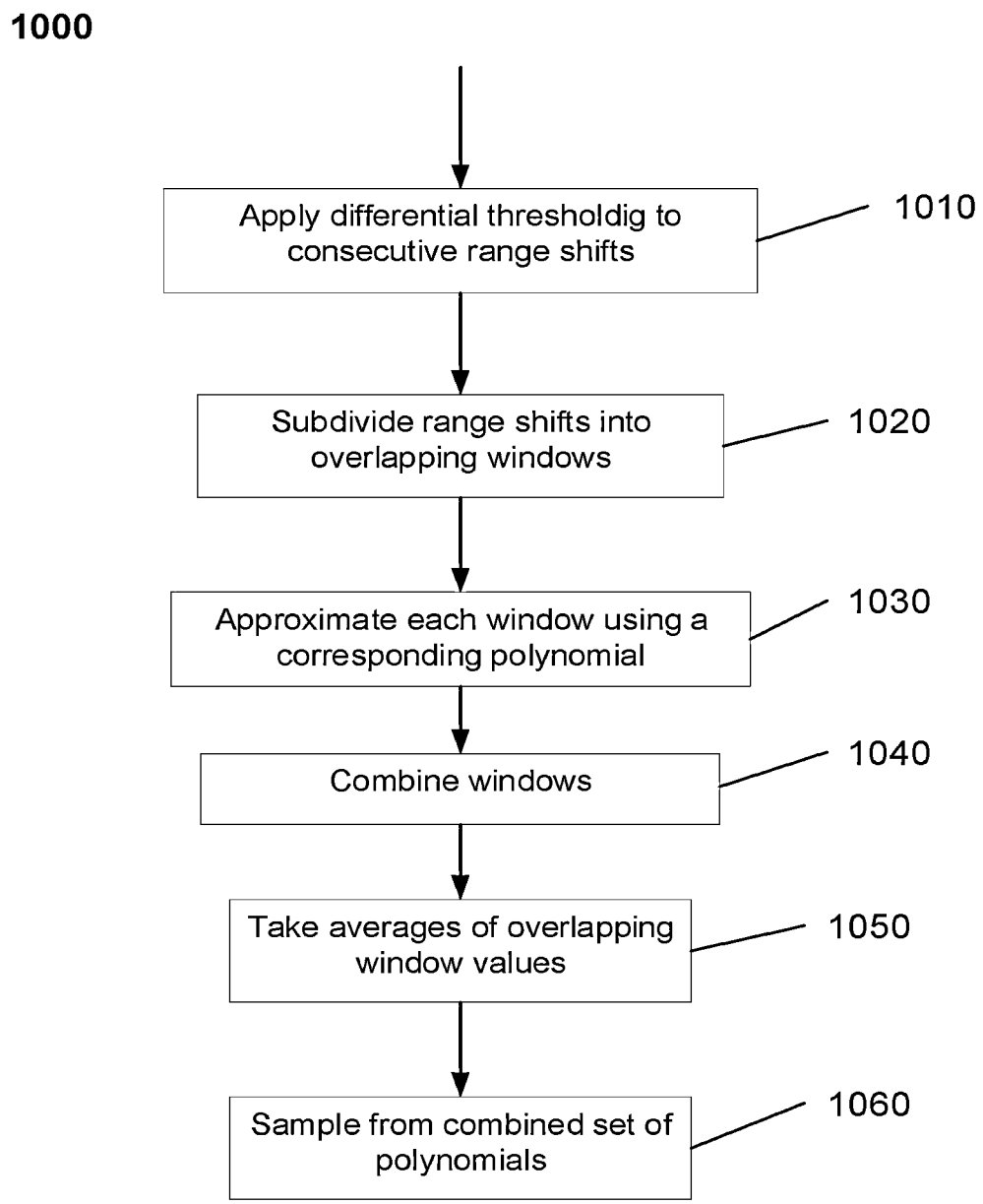
FIG. 10 shows a method of applying smoothing to offset values according to an arrangement.

FIG. 10 shows a method of applying smoothing to offset values according to an arrangement.

After the motion compensation method, differential thresholding is applied 1010 to consecutive range shifts to remove discontinuities. This can remove any remaining discontinuities before polynomial smoothing is applied.

Range shifts (offsets) that differ from a previous, or next, range shift by more than a predefined amount are removed from the set of range shifts, or replaced with an interpolated range shift.

The smoothing method then subdivides 1020 the range shifts into shorter, overlapping windows and approximates 1030 each window using a polynomial. This fits, for each window, a polynomial to the range shifts in the window. A lower order polynomial may be utilised without loss of information due to the subdivision of the range shifts into smaller windows.

The polynomials for the windows are combined 1040 through concatenation and by taking an average 1050 of the respective polynomials over any overlapping regions.

Following this, smoothed offset values are determined by sampling from the combined polynomials 1060.

With increased scanning time and motion complexity, the target's radial variations can no longer be reliably captured using low order polynomials. Rather than increasing the polynomial order, the windowed-approximation approach subdivides 1020 the long scan into shorter overlapping windows that are estimated separately using low order polynomials 1030.

In general, the parameters of the proposed method depend on the expected target motion and system design. For instance, the frequency of update of the reference profile depends on the expected target rotational velocity and/or the scanning pulse repetition frequency. The window length for the polynomial approximation can also be selected in a similar manner.

Three method of improving motion compensation for range tracking (and potentially for ISAR) are proposed herein. Firstly, multiple reference range profiles may be used across the measurement window (the integration angle) to allow changes in illumination angle to be taken into account (FIG. 7). Secondly, correlation values that are close to a preceding maximum can be boosted in a subsequent correlation distribution to reduce discontinuities when determining the offset based on maximum correlation. Thirdly, the offset values may be smoothed using multiple lower order polynomials through windowing. Under certain circumstances each of these features can be used separately or in combination, as needed.

Simulation and real measurement results illustrate the robustness of the methods described herein against multi-reflection and rapid fluctuations in the target's returns.

Figure 11A:
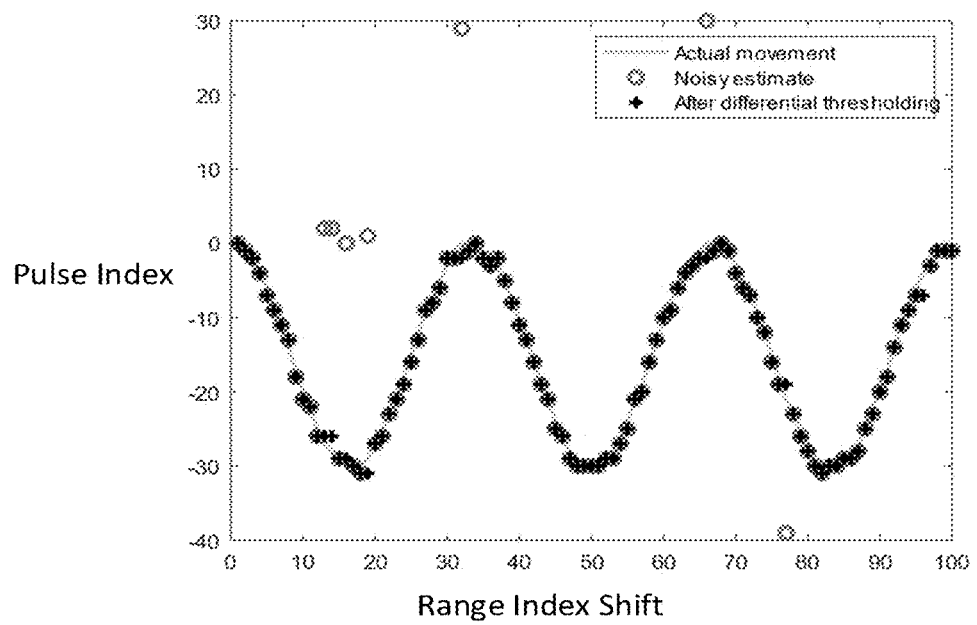
FIG. 11A shows a comparison between noisy range estimates and range estimates after differential thresholding.
Figure 11B:
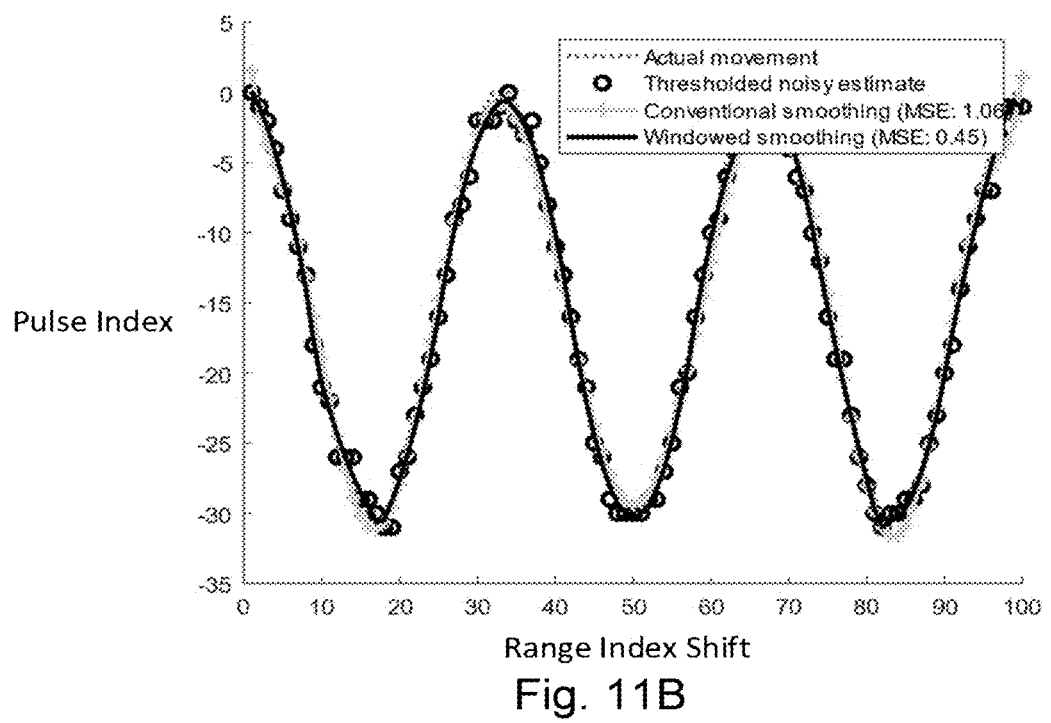
FIG. 11B shows a comparison between conventional high-order polynomial smoothing and windowed low order polynomial smoothing.

FIG. 11A shows a comparison between noisy range estimates and range estimates after differential thresholding. FIG. 11B shows a comparison between conventional high-order polynomial smoothing and windowed low order polynomial smoothing. It should be noted that the widowed approximation approach benefits from the preceding motion compensation as it provides smoother output compared to conventional methods.

Figure 12A:
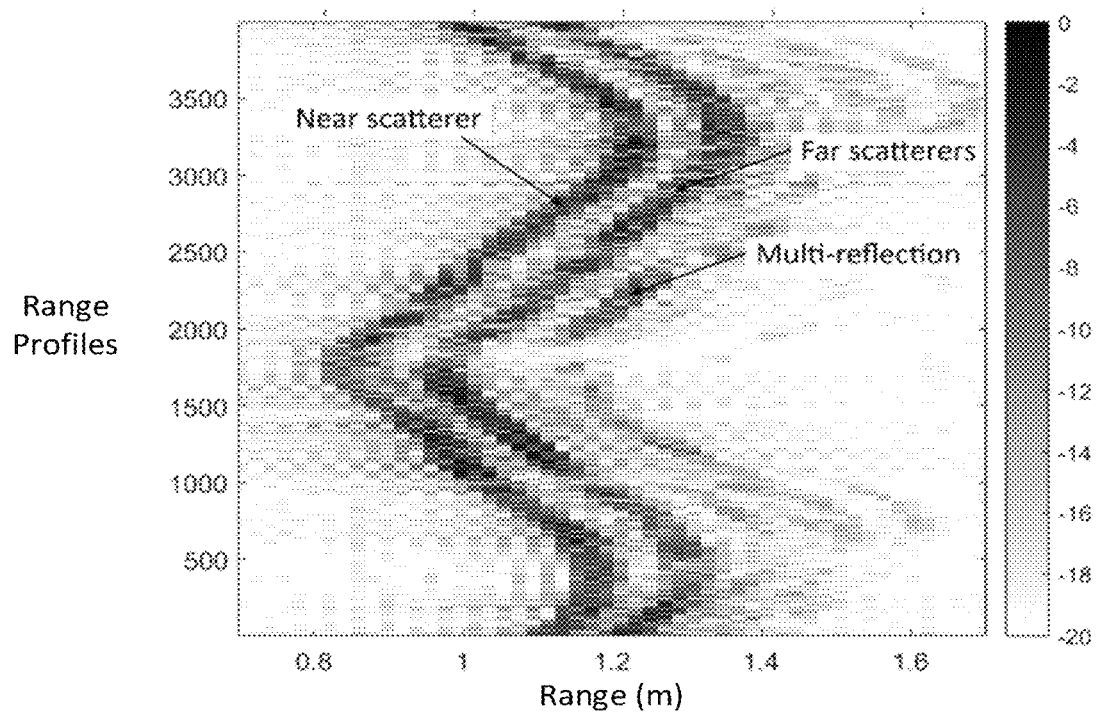
FIG. 12A shows real radar range profiles across a number of pulses for a two scatterer target.
Figure 12B:
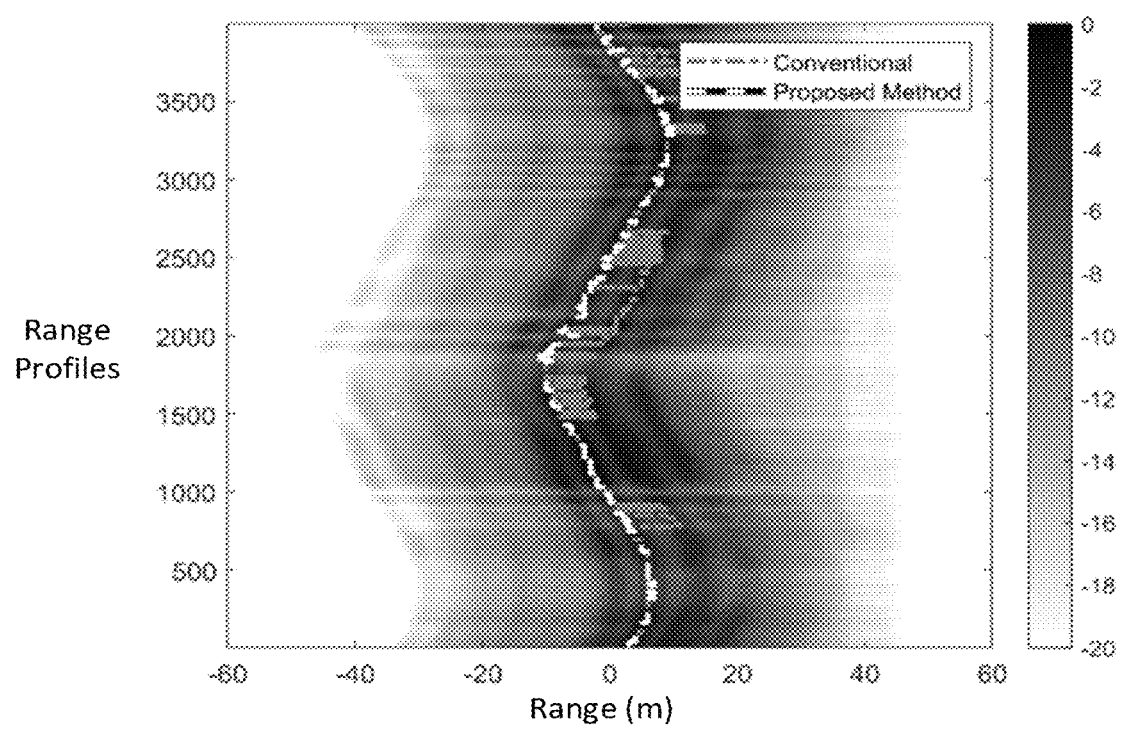
FIG. 12B shows the calculated offset values of the real radar range profiles across a number of pulses for a two scatterer target.

FIGS. 12A and 12B show real radar range profiles across a number of pulses for a two scatterer target (FIG. 12A) and its calculated offset values (FIG. 12B).

Figure 13A:
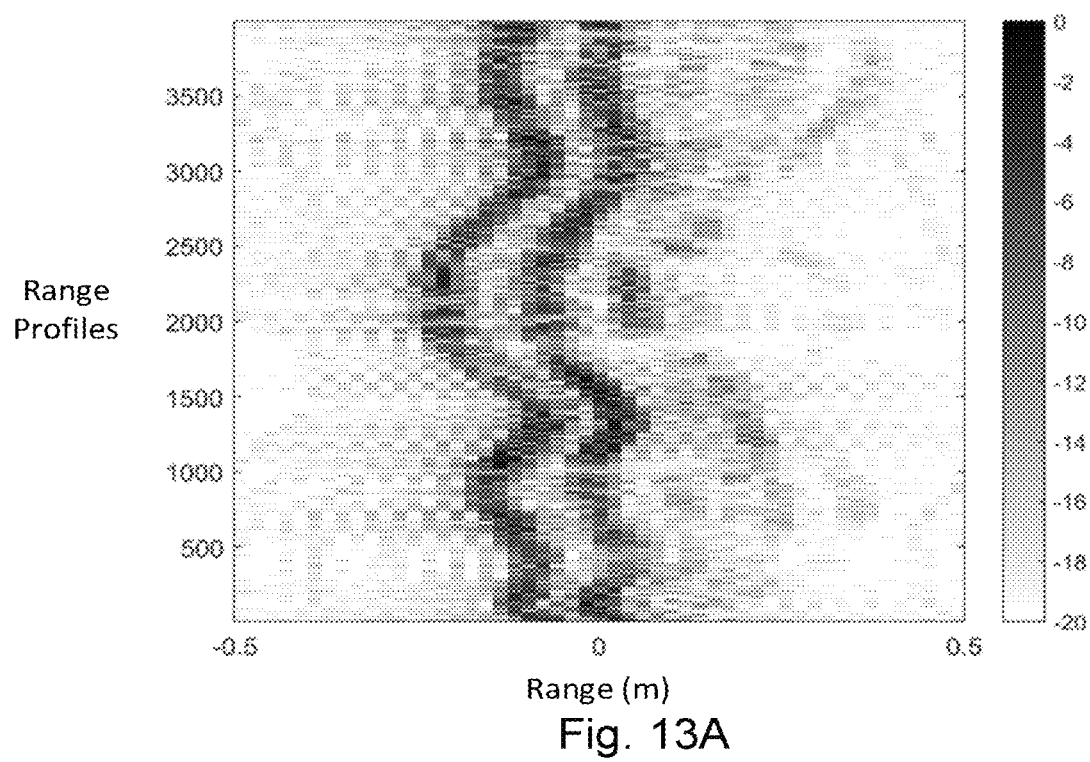
FIG. 13A shows aligned range profiles using motion compensation described with reference to FIG. 5.
Figure 13B:
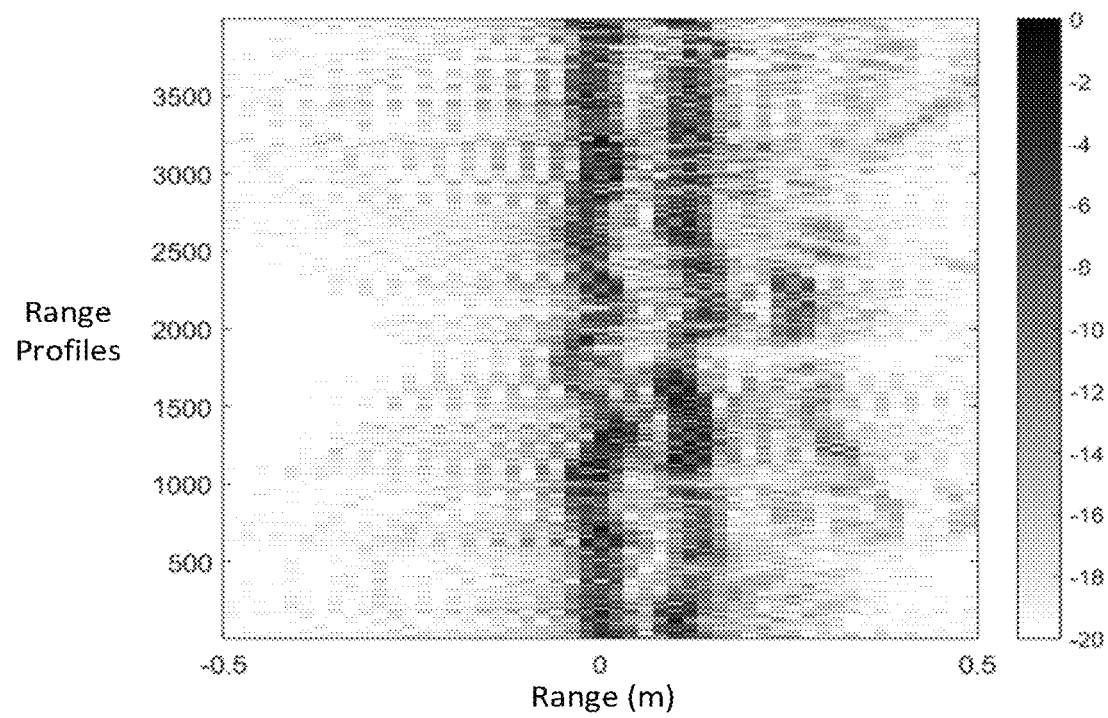
FIG. 13B shows aligned range profiles using motion compensation described with reference to FIG. 7.

FIG. 13A shows aligned range profiles using motion compensation described with reference to FIG. 5. FIG. 13B shows aligned range profiles using motion compensation described with reference to FIG. 7.

FIGS. 12B and 13B show the advantages of applying the methods described herein on real radar measurements. The target consists of three corner reflectors in the shape of a triangle pointing towards the radar. The two reflectors at the base of the triangle are not discernible in range. As the radar scans the scene for 4 seconds at 1 KHz pulse repetition frequency (obtaining 4000 range profiles), the target oscillates and moves across multiple range cells. Strong multi-reflection effects can also occur as seen in FIG. 12A.

FIGS. 13A and 13B compare the output of the conventional cross-correlation range tracking method with the improved motion compensation method. It can be noticed that the maximum power return is better aligned in FIG. 13B using the improved motion compensation method and presents robustness against multireflection and target scintillation.

While certain arrangements have been described, the arrangements have been presented by way of example only, and are not intended to limit the scope of protection. Indeed, the novel methods and devices described herein may be embodied in a variety of other forms; furthermore, various omissions, substitutions and changes in the form of the methods and systems described herein may be made.

The invention claimed is:

1. A computer implemented method comprising:
 obtaining a plurality of range profiles each representing a plurality of return measurements from a corresponding pulse;
 selecting one or more sets of range profiles from the plurality of range profiles;
 for a selected set of range profiles, selecting a reference range profile from the plurality of range profiles;
 for a selected reference range profile, applying motion compensation to a corresponding set of range profiles based on the reference range profile, wherein applying motion compensation comprises:
  for a range profile of the selected set of range profiles in the corresponding set of range profiles, correlating the range profile with the reference range profile to produce a corresponding correlation distribution;
  determining for a first correlation distribution of the correlation distributions a range shift corresponding to a maximum correlation in the correlation distribution, the maximum correlation indicating correlation values that are within a predefined threshold of a peak value in the correlation distribution;
  for a subsequent correlation distribution from the correlation distributions:
   determining a region of range shifts around a determined range shift corresponding to a maximum correlation of a previous correlation distribution;
   increasing correlation values for the correlation distribution across the region of range shifts to produce a boosted correlation distribution; and
   determining a range shift corresponding to a maximum correlation in the boosted correlation distribution;
 adjusting the range profile to compensate for the range shift corresponding to the maximum correlation; and
 outputting the adjusted range profile to an inverse synthetic aperture radar to determine a feature of a target.

2. The computer implemented method according to claim 1, wherein a size of the region of range shifts is based on a shape of the previous correlation distribution.

3. The computer implemented method according to claim 2, wherein the region of range shifts includes all range shifts with correlation values that are within a predefined threshold of a peak value of the previous correlation distribution.

4. The computer implemented method according to claim 1, wherein a size of the region of range shifts is based on a range resolution of the range profiles or an expected velocity of a target.

5. The computer implemented method according to claim 1, wherein adjusting the range profile to compensate for the range shift comprises shifting the range profile by the range shift corresponding to the maximum correlation.

6. The computer implemented method according to claim 1, wherein selecting the reference range profiles from the plurality of range profiles comprises selecting a plurality of reference range profiles from the plurality of range profiles.

7. The computer implemented method according to claim 1, wherein the reference range profile is selected from the corresponding set of range profiles.

8. The computer implemented method according to claim 1, wherein selecting the set of range profiles is based on an expected target velocity.

9. The computer implemented method according to claim 1, wherein selecting each the set of range profiles is based on a frequency of the corresponding pulses.

10. The computer implemented method according to claim 1, wherein adjusting each the range profile to compensate for the range shift comprises:
 subdividing the range shifts into a plurality of windows;
 for each window, fitting a polynomial distribution to the range shifts in the window;
 combining the polynomial distributions into a combined distribution;
 obtaining a smoothed range shift for each a range profile by sampling from the combined distribution; and
 adjusting the range profile to compensate for the smoothed range shift.

11. The computer implemented method according to claim 10, wherein the method further comprises removing range shifts that exceed a previous or following range shift by a threshold.

12. The computer implemented method according to claim 10, wherein the plurality of windows partially overlap.

13. The computer implemented method according to claim 12, wherein combining the polynomial distributions into a combined distribution comprises taking an average between polynomial distributions within overlapping regions of the plurality of windows.

14. The computer implemented method according to claim 10, wherein a size of each of the plurality of windows is based on an expected target velocity.

15. The computer implemented method according to claim 10, wherein a size of each of the plurality of windows is based on a frequency of corresponding pulses.

16. A non-transitory machine-readable storage medium storing instructions which, when executed, cause a processing device to perform a method including:
obtaining a plurality of range profiles each representing a plurality of return measurements from a corresponding pulse;
selecting one or more sets of range profiles from the plurality of range profiles;
for a selected set of range profiles, selecting a reference range profile from the plurality of range profiles;
for a selected reference range profile, applying motion compensation to a corresponding set of range profiles based on the reference range profile, wherein applying motion compensation comprises:
for a range profile of the selected set of range profiles in the corresponding set of range profiles, correlating the range profile with the reference range profile to produce a corresponding correlation distribution;
determining for a first correlation distribution of the correlation distributions a range shift corresponding to a maximum correlation in the correlation distribution, the maximum correlation indicating correlation values that are within a predefined threshold of a peak value in the correlation distribution;
for a subsequent correlation distribution from the correlation distributions:
determining a region of range shifts around a determined range shift corresponding to a maximum correlation of a previous correlation distribution;
increasing correlation values for the correlation distribution across the region of range shifts to produce a boosted correlation distribution; and
determining a range shift corresponding to a maximum correlation in the boosted correlation distribution;
adjusting the range profile to compensate for the range shift corresponding to the maximum correlation; and
outputting the adjusted range profile to an inverse synthetic aperture radar to determine a feature of a target.

17. A system comprising:
a memory; and
a processing device, operatively coupled with the memory, to:
obtain a plurality of range profiles each representing a plurality of return measurements from a corresponding pulse;
select one or more sets of range profiles from the plurality of range profiles;
for a selected set of range profiles, select a reference range profile from the plurality of range profiles;
for a selected reference range profile, apply motion compensation to a corresponding set of range profiles based on the reference range profile, wherein applying motion compensation comprises:
for a range profile of the selected set of range profiles in the corresponding set of range profiles, correlate the range profile with the reference range profile to produce a corresponding correlation distribution;
determine for a first correlation distribution of the correlation distributions a range shift corresponding to a maximum correlation in the correlation distribution, the maximum correlation indicating correlation values that are within a predefined threshold of a peak value in the correlation distribution;
for a subsequent correlation distribution from the correlation distributions:
determine a region of range shifts around a determined range shift corresponding to a maximum correlation of a previous correlation distribution;
increase correlation values for the correlation distribution across the region of range shifts to produce a boosted correlation distribution; and
determine a range shift corresponding to a maximum correlation in the boosted correlation distribution;
adjust the range profile to compensate for the range shift corresponding to the maximum correlation; and
output the adjusted range profile to an inverse synthetic aperture radar to determine a feature of a target.

18. The computer implemented method according to claim 1, wherein adjusting the range profile to compensate for the range shift comprises:
subdividing the range shifts into a plurality of windows;
for each window, fitting a polynomial distribution to the range shifts in the window; and
combining the polynomial distributions into a combined distribution, wherein combining the polynomial distributions into a combined distribution comprises taking an average between polynomial distributions within overlapping regions of the plurality of windows.

* * * * *